A. O. ROW.
ATTACHMENT FOR MILK PAILS.
APPLICATION FILED JULY 6, 1914.
1,135,848.
Patented Apr. 13, 1915.
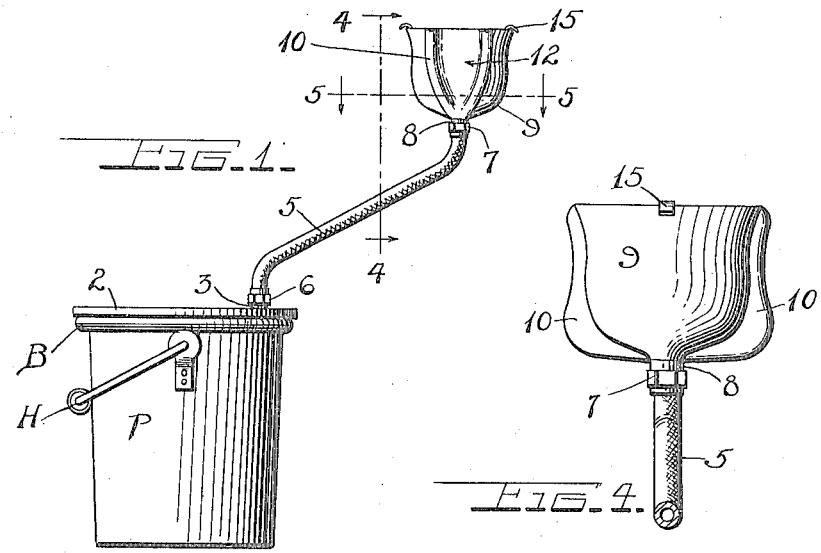
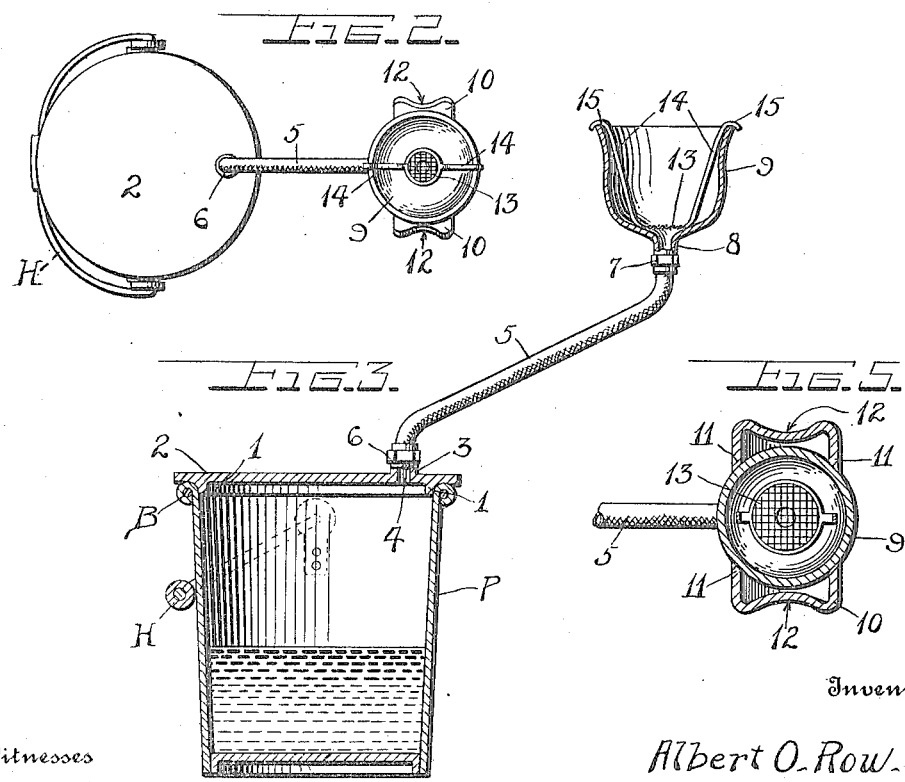
Witnesses
Edwin B. Hunt.
Inventor
Albert O. Row.
By H. B. Willson & Co.
Attorneys

UNITED STATES PATENT OFFICE.

ALBERT O. ROW, OF GRAND ISLAND, NEBRASKA.

ATTACHMENT FOR MILK-PAILS.

1,135,848.  Specification of Letters Patent.  Patented Apr. 13, 1915.

Application filed July 6, 1914. Serial No. 849,141.

*To all whom it may concern:*

Be it known that I, ALBERT O. ROW, a citizen of the United States, residing at Grand Island, in the county of Hall and State of Nebraska, have invented certain new and useful Improvements in Attachments for Milk-Pails; and I do declare the following to be a full, clear, and exact description of the invention, such as will enable others skilled in the art to which it appertains to make and use the same.

This invention relates broadly to improvements in milking apparatus and more particularly to improvements in milk pails.

The primary object of the invention is to provide a cover plate which may be attached to any milk pail and to provide a receiving bowl in communication with an opening formed through said plate whereby the latter may act, in connection with the pail, as a milking stool and yet as a milk receptacle.

In carrying out the above end, the secondary object of the invention becomes to provide the milk receiving bowl with recessed extensions adapted to receive the knees of the person employing the device, whereby said bowl may be readily supported.

With the above and minor objects in view, the invention resides in the features of construction herein described and claimed and shown in the drawings wherein—

Figure 1 is a side elevation showing the application of my invention to a milk pail; Fig. 2 is a top plan view of the parts shown in Fig. 1; Fig. 3 is a vertical section partly in elevation thereof; Fig. 4 is a vertical section taken on the line 4—4 of Fig. 1; and, Fig. 5 is a horizontal section taken on the plane of the line 5—5 of Fig. 1.

In the accompanying drawings I have shown a milk pail P of the usual construction which is here shown as provided with a bail or handle H and with an annular bead B formed around its upper edge.

Adapted to rest upon the bead B and having a flange 1 projecting into the interior of the pail, is a combined cover plate and seat 2, the latter having, near one edge, an upright boss 3 through which an inlet opening 4 is formed, a flexible tube 5 being removably connected at one end to said boss 4 by a suitable coupling 6, while the opposite end of said tube is removably connected by a coupling 7 to a nipple 8 which is formed on the bottom of a receiving bowl 9 which latter may be of any suitable formation but preferably conforms to the contour shown in the drawings.

As clearly shown in the various figures of the drawings, extensions 10 are provided on opposite sides of the bowl 9, said extensions being formed of pieces of sheet metal bent into substantially U-shape in horizontal section and having their free edges 11 soldered or otherwise secured to the annular wall of said bowl 9. As most clearly seen in Fig. 5, the body portions of the extensions 10 are bulged or bent inwardly as indicated at 12, thereby producing formations which readily receive the knees of the person employing the device.

In connection with the features above set forth, I preferably employ a circular strainer 13 which is adapted to be positioned in the bowl 9 above the coupling 8, said strainer being provided with a pair of upwardly diverging arms 14 whose extreme upper ends are bent outwardly to form hooks 15 adapted to engage the upper edge of said bowl 9 as clearly seen in Fig. 3.

From the foregoing description taken in connection with the accompanying drawings it will be seen that I have produced an extremely simple device which may be readily employed in connection with pails of ordinary construction, that novel means has been employed for receiving the knees of the person using the device, and that the coverplate 2, the tube 5 and the bowl 9 may be readily disconnected for the purpose of cleaning and the like.

Having thus described my invention what I claim as new and desire to secure by Letters-Patent is:—

1. In a device of the character described, a receiving bowl having knee engaging portions on its opposite sides and an outlet tube leading from said bowl.

2. In a device of the character described, a receiving bowl, recessed knee receiving extensions on opposite sides thereof and a tube leading from said bowl.

3. In a device of the character described, a receiving bowl, extensions on opposite sides thereof and each formed of single pieces of sheet metal bent into substantially U-shape in horizontal section, the upright body portions of said extensions being bulged inwardly to provide knee receiving recesses, and a discharge tube leading from said bowl.

4. An attachment for milk pails comprising a circular cover plate having an opening, a flexible tube rising from said plate and communicating with the opening, a receiving bowl communicating with the opposite end of said flexible tube and knee engaging portions on opposite sides of said bowl.

5. An attachment for milk pails comprising a cover plate designed to be positioned upon a milk pail, said plate having an opening, a rigid receiving bowl spaced from said cover plate and having knee receiving portions on opposite sides, and a flexible tube leading from the receiving bowl to said inlet opening.

6. An attachment for milk pails comprising a cover plate having a depending flange designed to engage a milk pail, said plate also having an eccentric inlet opening, a rigid receiving bowl spaced from said cover plate and designed to be supported between the knees of the operator, and a detachable flexible tube leading from the bowl to the inlet opening.

In testimony whereof I have hereunto set my hand in presence of two subscribing witnesses.

ALBERT O. ROW.

Witnesses:
M. GUY BRITT,
BENJ. J. CUNNINGHAM.

Copies of this patent may be obtained for five cents each, by addressing the "Commissioner of Patents, Washington, D. C."